US006379766B1

(12) United States Patent
Blom et al.

(10) Patent No.: US 6,379,766 B1
(45) Date of Patent: Apr. 30, 2002

(54) LABEL, CONTAINER COMPRISING SAID LABEL AND METHOD OF WASHING SUCH A CONTAINER

(75) Inventors: Patrick Johannes Blom; Erwin Anton Rosens, both of Leiden (NL); Thomas Lynn Brandt, Windsor, NY (US)

(73) Assignee: Heineken Technical Services B.V., Amsterdam (NL)

( * ) Notice: Subject to any disclaimer, the term of this patent is extended or adjusted under 35 U.S.C. 154(b) by 0 days.

(21) Appl. No.: 09/155,031

(22) PCT Filed: Mar. 19, 1997

(86) PCT No.: PCT/NL97/00139

§ 371 Date: Jan. 28, 1999

§ 102(e) Date: Jan. 28, 1999

(87) PCT Pub. No.: WO97/35292

PCT Pub. Date: Sep. 25, 1997

(30) Foreign Application Priority Data

Mar. 20, 1996 (EP) ............................................ 96200780
Aug. 12, 1996 (EP) ............................................ 96202262

(51) Int. Cl.[7] ............................ B32B 9/00; B32B 3/00; B32B 7/12

(52) U.S. Cl. .................... 428/42.1; 428/40.5; 428/41.3; 428/41.6; 428/41.8; 428/42.1; 428/346; 428/348; 428/195

(58) Field of Search ............................... 428/40.1, 40.5, 428/41.3, 41.6, 41.7, 41.8, 42.1, 343, 346, 195, 348, 355 EN, 355 AC, 355 N

(56) References Cited

U.S. PATENT DOCUMENTS

| | | | | | |
|---|---|---|---|---|---|
| 3,937,853 | A | * | 2/1976 | Shank, Jr. | 427/29 |
| 3,989,609 | A | * | 11/1976 | Brack | 428/40 |
| 4,444,839 | A | * | 4/1984 | Dudzik et al. | 428/336 |
| 5,141,789 | A | * | 8/1992 | Matsuzawa et al. | 428/40 |
| 5,176,953 | A | * | 1/1993 | Jacoby et al. | 428/315.5 |
| 5,527,615 | A | * | 6/1996 | Kimura et al. | 428/421 |

FOREIGN PATENT DOCUMENTS

| | | | | |
|---|---|---|---|---|
| DE | 30 37 250 | A | | 4/1982 |
| GB | 2 259 291 | A | | 3/1993 |
| WO | WO 90 05088 | A | | 5/1990 |
| WO | 90/05088 | | * | 5/1990 |
| WO | 97/32293 | | | 9/1997 |

* cited by examiner

*Primary Examiner*—Harold Pyon
*Assistant Examiner*—Michael C. Miggins
(74) *Attorney, Agent, or Firm*—Pearne & Gordon LLP

(57) ABSTRACT

The invention is directed to an ink-only label at least consisting of an adhesive layer, an ink-only image layer and optionally a protective layer, wherein the label, when applied to a substrate, has a water permeability coefficient, as defined herein, which is sufficient to enable fast removal of the label from the substrate with water or an aqueous alkaline solution, without destructive treatment of the said substrate.

18 Claims, 7 Drawing Sheets

LABEL & SUBSTRATE
EXPLODED VIEW

COATING APPLICATION

TOP VIEW

APPLICATOR DETAIL

LABEL, CONTAINER COMPRISING SAID LABEL AND METHOD OF WASHING SUCH A CONTAINER

BACKGROUND OF THE INVENTION

The invention relates to an ink only label, which is removable from a substrate to which it has been applied by washing with water or an aqueous alkaline solution and to a transfer label comprising a backing layer and the ink only label which is releasably attached to the backing layer.

The invention also relates to a container provided with an ink only label according to the invention and to a method of removing the ink only label from such a container.

More in particular the present invention is directed to a label for returnable plastic containers such as crates and more specifically to decorative promotional and/or informational labels suitable for use on plastic crates. Still more particularly, the invention is directed to a label composite which applies only the inks of the graphics to a polymeric substrate, having the ability to be removed from the substrate, without destructive treatment of the substrate surface, so that the substrate can be relabelled.

It is known in the packaging technology art to label containers such as plastic crates by providing a non-removable permanent image by a silk screen method. Such labels offer a highly durable finish with two or three color availability. This technique however offers limited colors, lacks the improved graphics that other labelling techniques offer, is not flexible in its ability to have graphic changes to meet market strategies leading to large inventories of obsolete units, tends to show signs of wear after about four trips (typical crate life expected at 60 return trips and is relatively expensive as compared to other label techniques.

When removable inks are to be applied to re-usable plastic crates by a screen printing or a tampon printing process, the inks have to be applied in the bottling plant, such as a brewery, which may lead to problems with respect to registration. Upon removal from the crates by means of crate washers, the inks will be dissolved in the washing liquid and in this way contaminate the crate washers. Furthermore the speed of application is limited, and curing of the inks requires a lot of space and long storage times prior to delivery.

A second way of labelling containers encompasses gluing printed paper labels to containers such as plastic crates or bottles at the time of filling and sealing. This type of label however offers little resistance to label damage from handling and exposure to moisture (wrinkling). Furthermore, paper labels are difficult to remove from crates, and tend to clog the crate washers available today. Upon removal of paper labels from plastic crates, a glue residue may be left on the crates.

A third technique for labelling containers, in particular glass bottles is based on the principles described in WO 90/05088. This method of labelling bottles provides a durable, highly impact resistant label and yet permits high definition label printing. A transfer label comprising a removable backing layer is provided which backing layer is reverse printed with a vinyl or acrylic ink which is cured and overprinted with adhesive. The label is applied to the container with its adhesive surface in contact therewith. The backing layer is separated from the transfer layer of the label for instance by the application of heat to either the container, the label or to both. The labelled container is then applied with a coating which is subsequently cured. The cured coating provides the required degree of impact resistance and durability. The disadvantage of permanently attached labels, is that when these labels get scratched or otherwise damaged, they cannot be easily removed from the bottles. Further, it is not possible to provide the same containers each time with new and/or different labels, which is desirable for promotional activities.

The need for returnable bottles and crates is a direct result of industry preference and government legislation with regard to returnable (refillable) containers in various parts in the world in lieu of one way packaging. In this type of recycling environment a whole new market has been created for the handling of packaged beverage containers. This is presently true of both refillable PET and glass bottle containers. Certain countries, European in particular, have invested large sums of money in the creation of distribution systems that rely heavily on the returnable crate concept.

Typically the only product presentation in such a recycling (refillable) market is that which can be printed on the exterior of the crate. Due to handling, space and storage considerations the only marketing, name brand, promotional, UPC code or other informational presentation is that which is printed on the exterior of the crate. The reason is that typically the crates are stacked at commercial outlets such as grocery stores with only the side and end panels showing. As such, the presentations on the said panels of the crates are the only distinguishing features from one product to another.

In the use of returnable crates it would be very interesting to be able to use one uniform crate for various different products or brands. However, this is only possible if there exists an easy and inexpensive method of providing an image or imprint on the crate, which is also easily removed after the crate is returned to the bottling line for refilling.

On the other hand, it is important that the label image or imprint on the crate is durable, especially during transport, storage and is durable even when subjected to humid conditions.

Accordingly it is an object of the invention to provide a label for a returnable plastic crate creating an imprint, or image on at least one of its surfaces, which is durable, scratch, wear, weather and moisture resistant during use, but which is easily removable during the crate washing operation upon return to the filler.

It is also an object of the invention that the label on the plastic container shall be impervious to handling contact and ambient storage conditions both outdoor and indoor.

It is also an object of the invention that the label, if desired, be readily and completely removed in the standard crate washer used when the plastic container is returned to the beverage plant for refilling.

It is also an object of the invention that the properties of the label with respect to removing it can be controlled, so that the label will not be removed or damaged in standard crate washing operations, but only under specific, more severe crate washing operations.

It is an object of the present invention that the labels incorporate a full range of graphics, from a simple one color up to a full photographic reproduction.

Finally it is also an object that the method be simple and low cost.

SUMMARY OF THE INVENTION

These and other objects are achieved by the ink-only label according to the present invention, said label at least consisting of an adhesive layer, an ink-only image layer and optionally a protective layer, wherein the label, when applied to a substrate, has a water permeability coefficient, as defined herein, which is sufficient to enable fast removal of the label from the substrate with water or an aqueous alkaline solution, without destructive treatment of the said substrate.

In order to provide the desired removal characteristics it has been found essential to control the water permeability characteristics of the label when applied to the substrate surface, such as a crate surface. On the one hand the water permeability must be sufficiently high to provide a speedy removal of the label through break-up and/or swelling of the material when immersed in or sprayed with water. On the other hand it should not be so high that the label becomes removed when subjected to normal ambient conditions. In effect the water permeability characteristics have been fine-tuned to provide a label that meets the criteria defined herein above.

The water permeability coefficient is defined as the amount of water that the label takes up, as a fraction of the dry weight of the label within a period of three hours immersion at 20° C. The coefficient can be determined using the test method for the water uptake.

As indicated above the value for this coefficient should on the one hand be sufficient to enable removal of the label from the substrate with water, without destructive treatment of the said substrate, and on the other hand be such that during normal outdoor conditions the label remains intact and good-looking.

In general this means that the lower limit for the water permeability coefficient is 0.15, preferably 0.25 and most preferred 0.50. The upper limit for this coefficient is 2.50, preferably 1.35 and most preferred 1.00.

According to a preferred embodiment the label of the invention possesses a water uptake test value which is between 1 and 75 g water/$m^2$ of label, typically about 5 g/$m^2$. The water uptake test value is especially a measure for the resistance of the label against removal by soaking. The test is carried out as defined furtheron.

When the value is not more than 75 g/$m^2$, the label is resistant to removal under ambient outdoor conditions, i.e. when the label has been applied to a crate which has been left in rainy conditions, the label will not become damaged or removed, at least to a substantial degree.

On the other hand, when the value is more than 1 g/$m^2$, preferably more than 2.5 g/$m^2$, the label can be removed sufficiently fast in a standard crate washing equipment.

Likewise the properties of the label can be determined using the pencil scratch test, which is also described in detail later, both under dry and wet conditions. In general test values for pencil hardness of at least 1 N indicate sufficient durability of the label under ambient (dry) conditions. Generally values between 1 and 10 N are acceptable, whereas lower values result in insufficient scratch resistance and values of over 7 N are indicative of labels that are not easily removed. After immersion in water the pencil hardness should drop to below 0.5 N within an acceptable period of time (10 min., preferably 3 min, more preferred 1 min.).

Another property of the label that is important for determining the ease of removal of the label from a substrate is the water vapor transmission rate per $m^2$ per 24 h. This rate should of course be higher than 0, as otherwise no vapor transmission will occur (and in all likelihood no water uptake). In general, suitable labels have a water vapor transmission rate of at least 50. The upper limit of this rate is about 750, whereas a typical, suitable value is about 600 g/$cm^2$/24 h.

The term "ink only label" is used herein to define a label that does not have a paper or plastic backing, but which comprises an image layer of ink, which is directly applied to a surface. Quite often the surface remains at least partly visible through the image layer. An ink only label may conveniently be applied to a surface by image transfer using a reverse printed label.

The label to be used in accordance with the present invention is essentially based on an ink image without a backing material. The ink image will adhered to the surface of the crate by an adhesive, and the surface of the image may be protected by a protective layer.

The present invention provides a distinct improvement over the prior art systems, which were based on paper or plastic labels. In order to remove these labels expensive high pressure equipment was necessary, especially in the case where labels were required on adjacent sides of the crate. Removal of the labels through simple soaking, as in the present invention, is virtually impossible. Further the residues of the labels have a tendency to clog the crate washing equipment.

The system of the present invention is less expensive and environmentally more friendly, as the residues of the ink only label are easily recovered from the water so that the water can be recycled.

The present invention also provides the possibility to use the label for scanning possibilities, for example by including a UPC (bar) code therein, which code may be used to define the recipient, the contents or any other information that is suitable. The system also allows the producer to reduce the stock of crates, as it is no longer necessary to keep stock crates of all brands or types. The system according to the present invention makes it possible for a producer to have only one type of crate for each type of material, for example a bottle, irrespective of the brand of the material. This makes it possible to reduce the stock of crates substantially. Of course the reduction would be even greater if the whole industry in a country or continent would decide to use the system.

In such a case many different producers (bottlers) of beverage containers would share common crates, and yet maintain individual market identification via the present invention. At the same time an improved user friendly and cost effective recycling system would be perfected. Such a system could be utilized on a national of even a multi-national level.

According to a preferred embodiment a transparent protective coating is present on top of the image layer. This coating improves the resistance of the label against environmental influences. Generally the material of the protective coating is compatible with the material of the ink. More preferably all materials, adhesive, ink and protective coating are at least partly based on acrylate polymers. In order to improve the durability of the label further, it may be advantageous that after application of the label (and the coating) one or more treatments are given. These treatments provide a coalescence of the materials of the various layers, resulting in improved service life, without, however, deteriorating the wash-off behaviour.

By careful selection of the composition of the label, the use of a protective coating and the nature of the post treatment, it is possible to steer the properties of the label, especially with respect to the behavior during crate washing. More specifically, it is possible to design the system in such a way, that the label is removed during standard crate washing. This means that after each return to the beverage filling plant, the label is removed and a new, optionally different, label may be applied. On the other hand, the label may be made so durable that it can not be removed or damaged during standard crate washing, but only in the case when a specific, severe washing operation is used. In this way the label is not permanent, however it has all the advantages of a permanent imprint, for example a silk screen, without the disadvantages thereof, such as the high costs thereof in terms of investments and energy requirements, inflexibility and low number of colors.

The selection of the adhesive to be used in adhering the label image to the crate surface will at least partly depend on the intended service life of the label, one-way or multiple trip use. Of course the adhesive must remain removable during crate washing. The adhesive must have been activated prior to or during application of the image to the crate. An easy and generally preferred method of applying the image is through the use of heat activatable adhesives, that have been applied to the image in the form of a reverse printed label. Other methods include the use of adhesives that can be activated through radiation, chemicals, electron-beam, micro-wave, UV and the like. It is also possible to use adhesives that can be activated through photo initiation, humidity, enzymatic action, pressure or ultra-sonic treatment.

It is preferred to use adhesives that are activated either by heat or by pressure. The latter case also encompasses adhesives, which require pressure to remain adhered, although they may have some tackiness without pressure. Preferred heat activatable adhesives have an initial tack temperature of not more than 90° C., preferably between 70 and 87.5° C.

The adhesive is preferably present on the back side of the image before it is applied to the crate surface. However, it is also possible to apply the adhesive to the crate prior to transferring the image. Another possibility is the use of inks in the image that have the adhesive incorporated therein.

The protective layer, if used, may be applied after the image has been transferred to the crate, for example using a conventional roller coater or spray system. In the alternative the protective layer may be part of the image material as it is transferred.

According to a further preferred embodiment the label layer consists of an image layer which is contained within containment layers, as described in the copending application of the same date titled: "Transfer label having ink containment layers. container comprising a transfer layer and method of washing such a container" (attorney reference BO 40707), the contents of which application is incorporated herein by way of reference.

The label of the present invention may be applied to a substrate surface by a method comprising in its broadest form:

providing a surface, preferably moving at a uniform rate of speed, presenting a reverse printed label according to the invention on a substrate, separable from its substrate, and transferring the label ink to the polymeric surface.

The label is applied to a polymeric surface which has preferably been surface treated and temperature stabilized. The label is applied by transferring the ink from its film substrate utilizing a roller or a pad. Preferably a heated roller is used under pressure. As indicated previously, the adhesive may either be present on the label or may be on the polymeric surface. The adhesive has to be activated prior to or during transfer. Depending on the type of adhesive, the activation method will differ. The skilled person will be aware which type of activation will be required. In case of a pressure sensitive adhesive, pressure will be applied during transfer. If a heat activatable adhesive is used, it is preferred to preheat the polymeric surface, optionally in combination with a heated transfer system, such as a roller.

In a preferred embodiment a heat activatable adhesive is used, in combination with a heat-pretreatment of the polymeric surface. As the heat activated adhesive printed over the ink becomes tacky, the ink is released from the film substrate and adheres to the plastic surface.

The labels may be supplied on a roll, from which the images are transferred to the substrate, optionally in combination with a cutting operation. It is also possible to provide a stack of separate labels, using a suitable application device, such as a magazine fed labeler.

Depending on the requirements on the image it may be preferred to have a protective coating on top thereof. This coating may have been applied as part of the reverse printed label during image transfer. In a preferred embodiment the protective coating is applied after image transfer, for example by the use of a roller coater.

In that situation, the transfer surface is coated with a thin layer of protective coating, such as an acrylic wax. Subsequently a post treatment, preferably one or more heat treatments are given. With this treatment the label materials coalesce and without being bound thereto, it is assumed that the durable bond obtained thereby is affected through inter-diffusion of the adhesive and plastic surface.

A label according to the present invention that combines sufficient durability during storage and use, with quick and economic removal, has preferably been heat treated after application to the container at a temperature of between 40° C. and 100° C., more preferably between 50° C. and 90° C.

In the case where the image has to be more durable, for example for multi-trip use, it is preferred to use either a more durable coating, such as a urethane or a cross-linked urethane, and/or a prolonged, more extensive post treatment.

It is well-known that polymeric materials and especially high density polyethylene in particular, are difficult materials to bond with adhesives. This invention describes a specific method of surface treatment to ensure adhesive bonding that is fast and economically.

An important discovery described in the invention is the coalescing of the label materials and surface coating by exposing the labelled area to very high temperatures for a few seconds to increase durability and resistance to moisture. This process alters the label composite from a series of adhered layers which are easily dissociated with immersion in water for two or more hours to a coalesced matrix of label adhesive, label inks and outer coating. During the heating the adhesive material inter diffuses with the plastic surface. The simultaneous coalescing and inter diffusion of this preferred embodiment of the invention result in a very durable label matrix. Resistance to water immersion can be varied from a few hours to several weeks by varying the time of exposure and the resultant temperature.

It should be noted, that the resistance to water immersion of an untreated label according to the invention may be sufficient as it never completely loses its bonding with the polymeric surface. The bonding only weakens; drying restores the bonding strength to its original value.

Having achieved the required label durability, it is also necessary to remove the label after it has served its purpose of identifying the contents of the container prior to consumption. The empty plastic containers and beverage bottles are returned to the beverage plant for refilling. The plastic containers are washed. During this wash the label must either be completely removed, or remain on the surface undamaged, depending on the situation (one-way or multi-trip).

In the former case, the heat treated adhesive used to bond the ink matrix, while durable in water, breaks down in the washing solution, preferably hot caustic, enabling the label and adhesive to be completely removed. The label residue is filtered out of the caustic solution. In the latter case the label is only removed when the washing conditions are changed to remove the label, for example by using a prolonged soaking and/or a stronger caustic solution, optionally in combination with the use of high pressure jets (liquid or gas).

Alternative methods for removing the images without a destructive treatment of the substrate (polymeric) surface comprise chemical removal (solvents), ultra sonic, sub-cooling, heating, brushing, enzymatic treatment, vacuum treatment, peeling and radiation, such as UV. Combinations of various methods are of course also possible.

The invention is also directed to a method of washing crates in order to remove the ink only label.

It may be desirable that the processing equipment be arranged so that the plastic containers are labelled in-line during the normal progression through the beverage facility, so that the crate label matches the bottle contents.

DETAILED DESCRIPTION OF THE INVENTION

Figure 1:
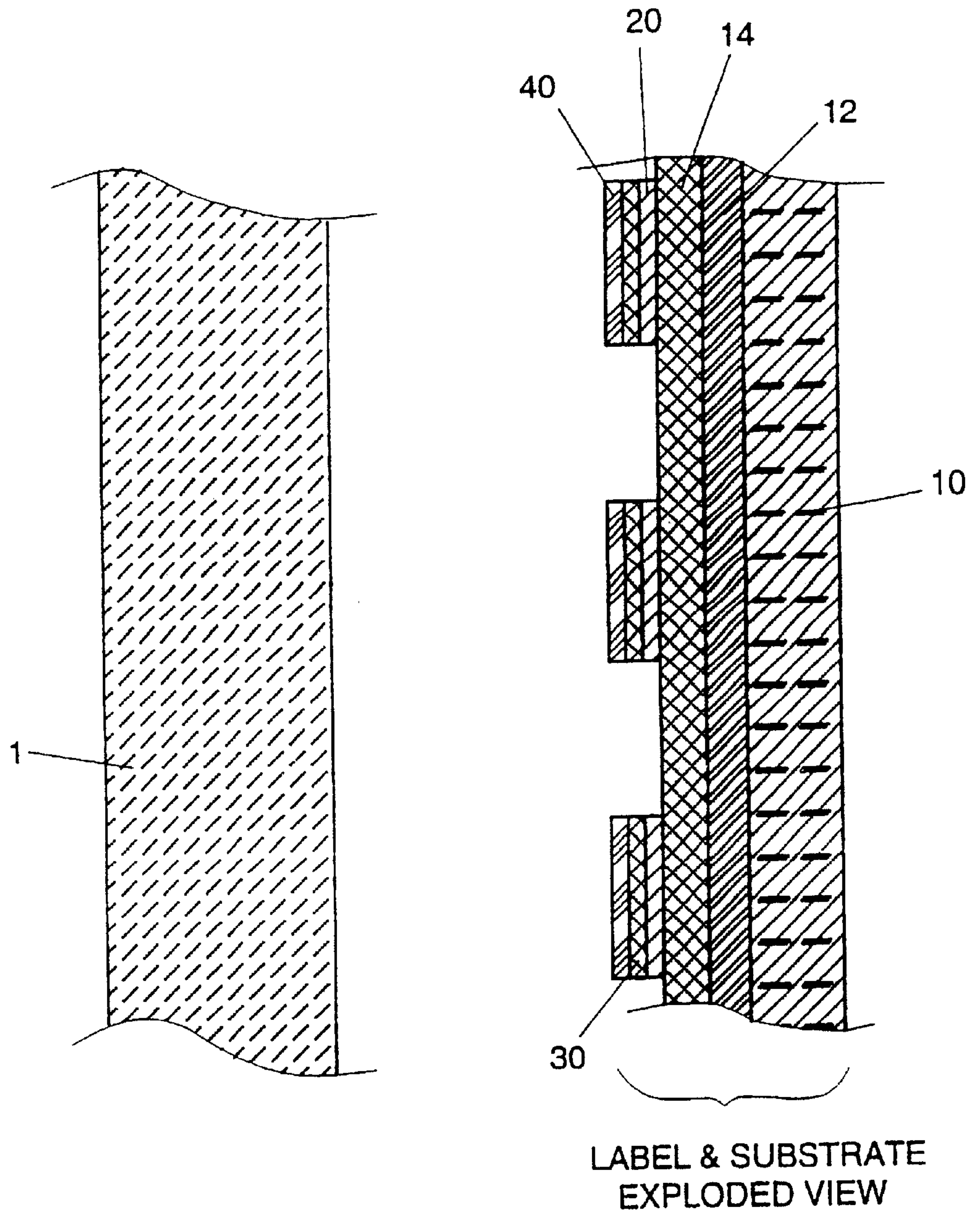
FIG. 1 Heat Transfer Label

The preferred embodiment of the label and application according to the present invention will be described first with references to FIG. 1 which shows the plastic container (1) and the label positioned for application. The label is printed on a film substrate (10) which may be any thin film, but in the case described is polypropylene of 2 mils thickness. (14) is an acrylic coating which may or may not be employed, depending on the type and source of the film available. (12) is a release material which coats the film. In the case of the invention it is silicone which is applied at the time of film manufacture. (20) represents all. the printed ink material. Depending on the label graphics and opacity requirements the ink materials may be as many as five (5) different colors in one or more layers, some of which many overlay another (30) and (40) represent two (2) layers of adhesive to indicate the build up of adhesive from 0.5 to 1.5 pounds per ream, depending on the labelled surface uniformity and rigidity of the container being labelled.

Upon application, all of the printed materials are transferred from the silicone release coated film substrate. The printed ink materials are urethane, vinyl or acrylic resin based, colored with temperature and ultra violet stable pigments. In the case of white ink, titanium dioxide is the pigment of choice. Pigment particle size ranges from three (3) to five (5) $\mu$m. The printed adhesive is a waterbased organic .material with an initial tack temperature of 185° F. (85° C.). This initial tack temperature is very important to the plastic labelling process because it determines the required plastic surface temperature at the time of transfer. With the particular plastic container being labelled, there is no support of the inside surface, hence it is desirable to maintain the plastic below 200° F. (93° C.) to avoid distortion of the surface by reaching its point of deformation during the label transfer.

Figure 4:
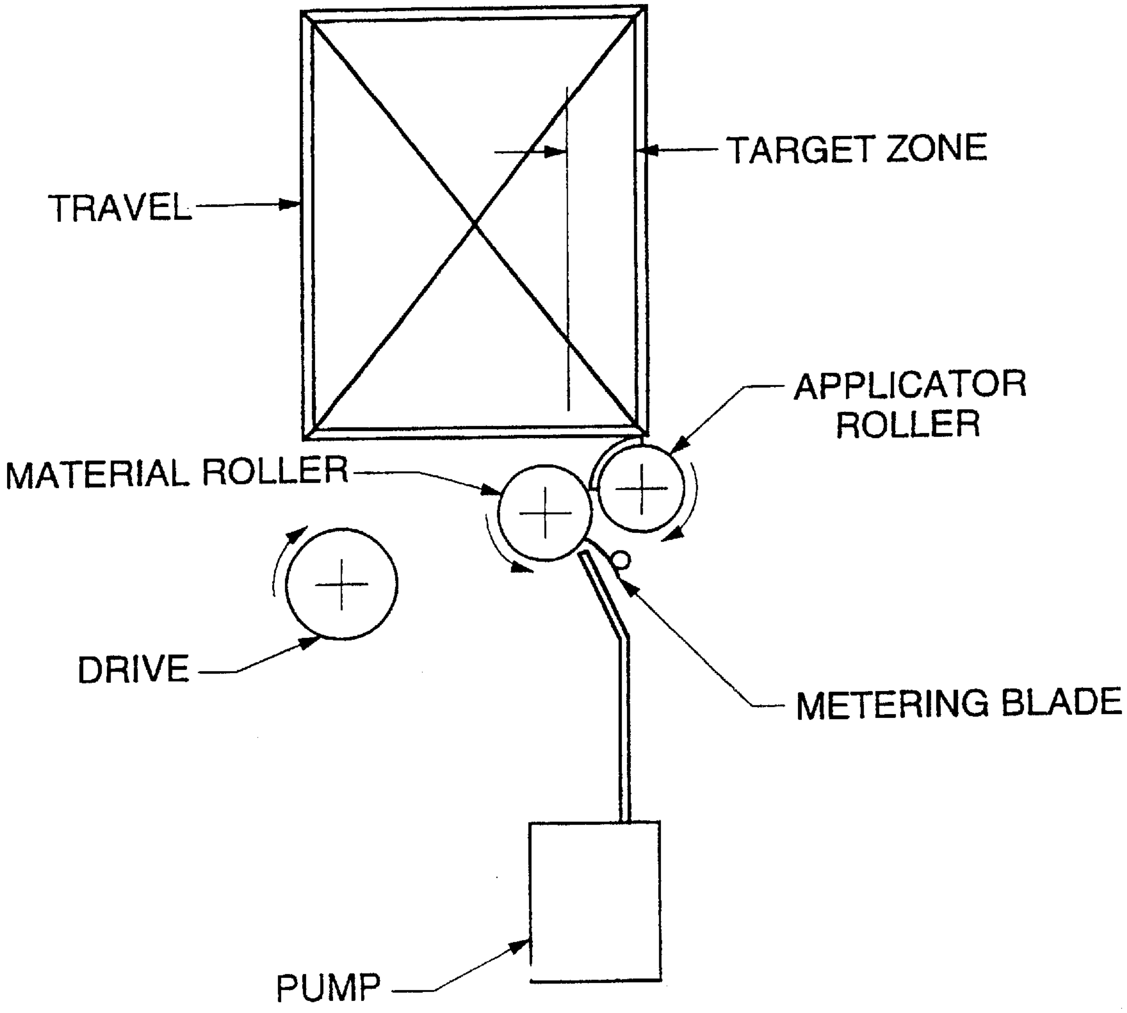
FIG. 4 Coating Application
Figure 4:
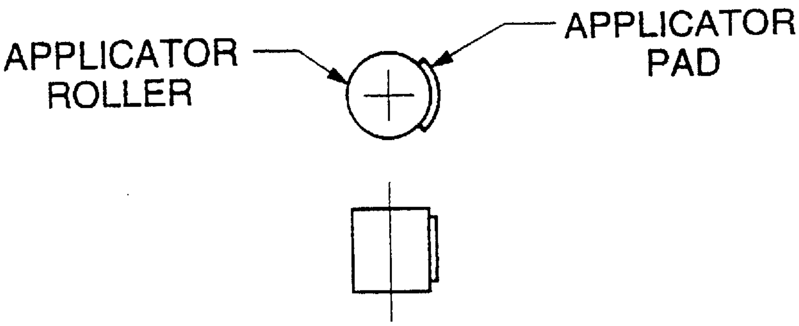
Figure 5:
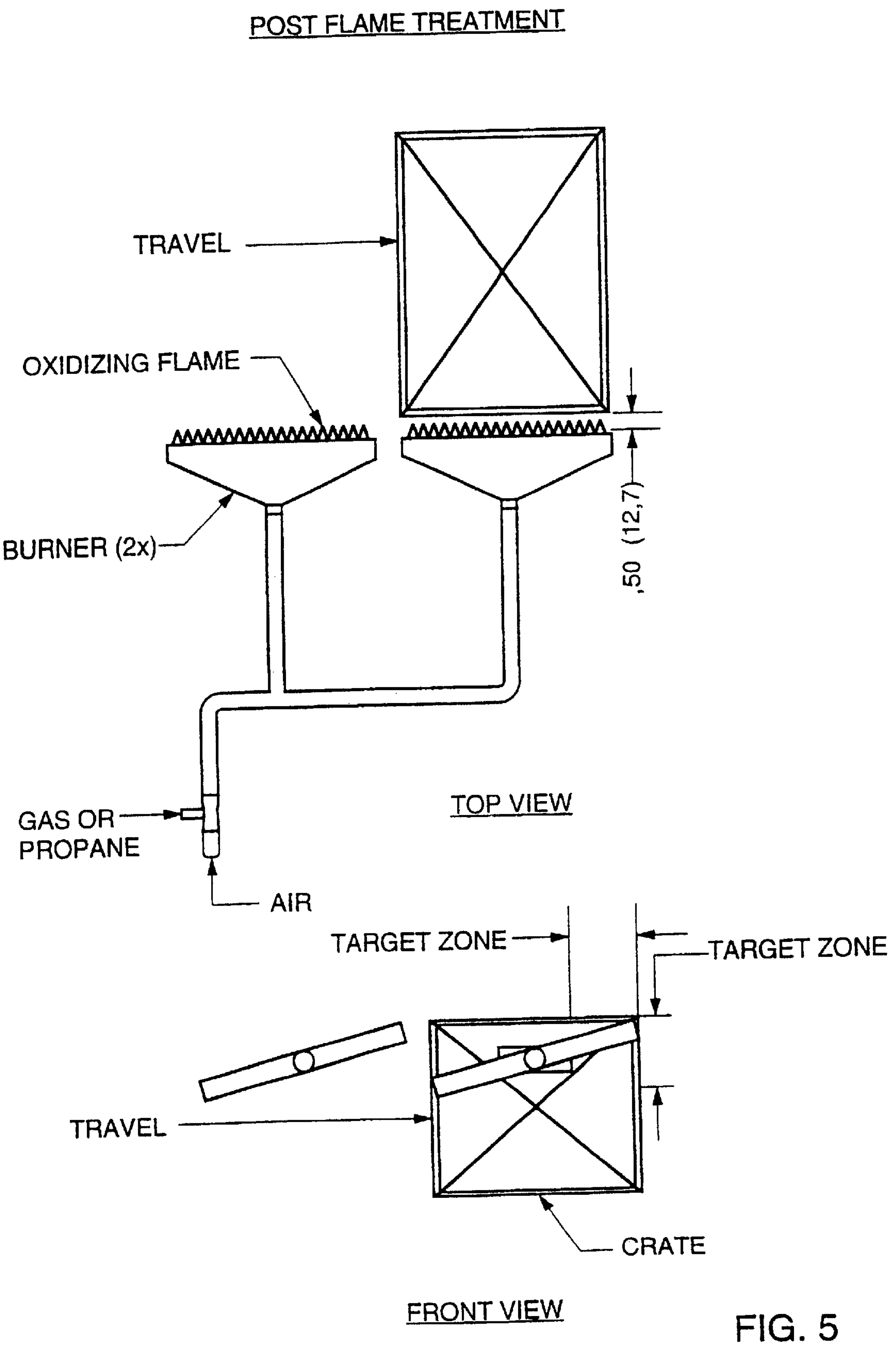
FIG. 5 Post Treatment
Figure 6:
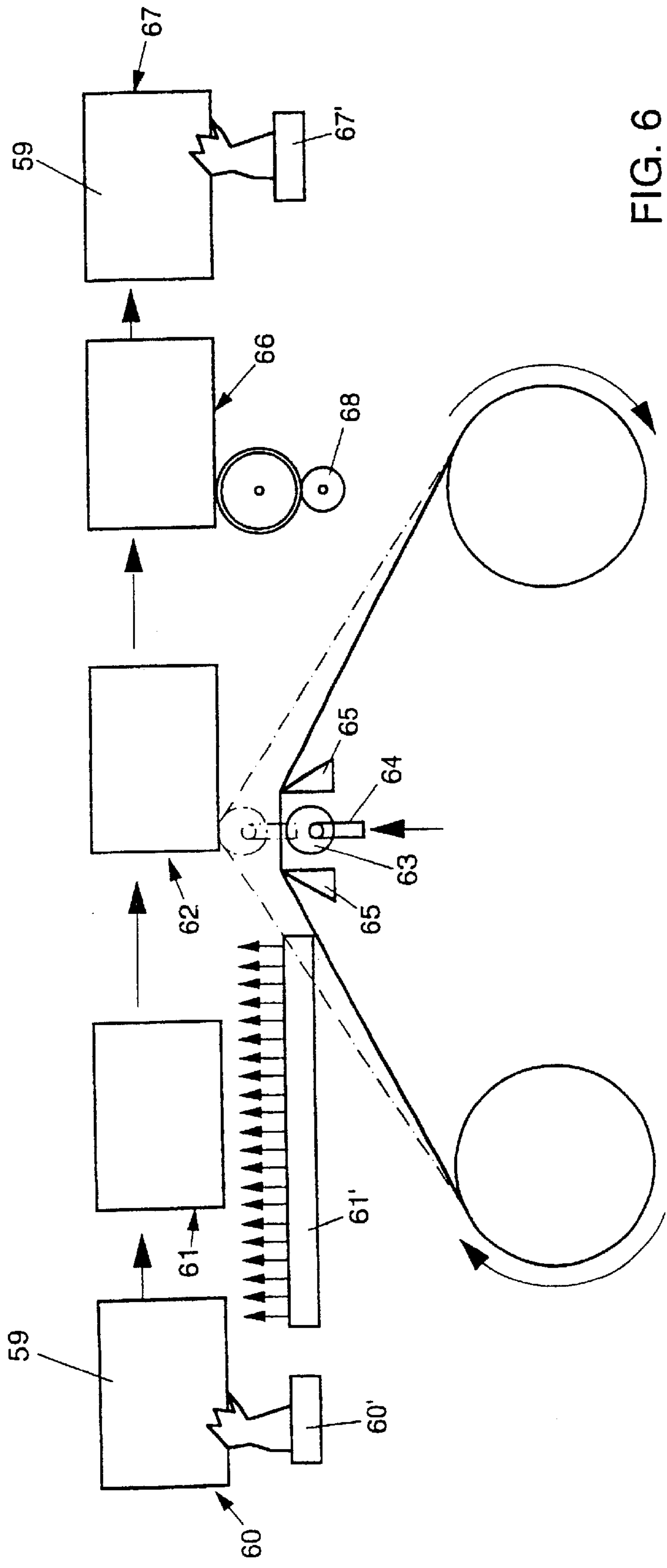
FIG. 6 schematically shows a method of applying the image layer according to the present invention, to a returnable crate

The label application method will now be described on the basis of FIG. 6, the presently developed best mode of application of the invention, whereby the FIGS. 2–5 show the various steps of the process in more detail FIG. 6 shows a schematic view of the application process of a transfer layer from a transfer label according to the invention to a returnable crate 59.

The label application process will now be described in the order of progression on the basis of this figure. Station 60 shows the step of surface treatment and temperature stabilization by means of a pre-heating treatment using a flame heater or burner 60'. For adhesion of two polymeric materials to occur, many factors must be considered such as cleanliness, pressure, temperature, contact time, surface roughness, movement during bonding and adhesive film thickness. An additional important consideration is the critical surface tension. The commonly accepted method of measuring the critical surface tension is with a Dyne solution, which is well known. For most adhesive applications the critical surface tension of polyethylene is 31 g/m$^2$. A series of tests were performed which demonstrated for best adhesion of the adhesive previously described to the polyethylene surface, a treatment level of 60 to 70 g/m$^2$ was necessary. Further testing of commercially available equipment showed that flame treatment optimized both capital cost, operating cost and time required to achieve the required critical surface treatment.

For the adhesive to achieve and maintain tack quickly it is necessary to heat the polyethylene crate 59 at station 61 before the label adhesive is in contact with it. To avoid deforming of the container, it is desirable not to heat the surface over 200° F. (93° C.). As the surface temperature leaving the flame treatment is approximately 125° F. (52° C.), it is necessary to heat the surface approximately 75° F. (24° C.) at station 61. Here again, many options are available for heating. Hot air, additional flame heaters, gas fired infrared panels and electric ceramic panels were all tested and found to be either too slow or difficult to control. It was found that an electrically heated flat fused quartz emitter plate 61' with zonal band control for localized label transfer would provide maximum free air transmission of infra-red energy without the effects of ambient environmental factors. With an emissivity of 0.9 for polyethylene a desired emitter plate temperature of between 1652° F. (900° C.) to 1725° F. (940° C.) will emit the most efficient wavelength (2.5 to 3.2 $\mu$m) of infra-red energy to peak absorption. The unit tested was rated at 60 watts per square inch. The time to heat the polyethylene surface the necessary 75° F. (24° C.) was 4.5 seconds at a distance from the emitter plate of 2.5 centimeters.

Station 62 illustrates the method of label application whereby the printed ink materials are transferred from the polypropylene film substrate to the polyethylene surface utilizing the tactile characteristics of the heat activated adhesive to overcome the bond of the transfer layer to the corona treated silicone coating. The factors that influence transfer are time to contact, temperature during contact, applied pressure and film tension during contact particularly tension of the film after ink release. The diameter of pressure roll 63 is also a factor but not a variable. For this application the roll diameters are 38 mm. The roller 63 was made of silicone rubber over a steel core, with rubber durometer ranging from 50 Shore A to 80 Shore A. It should be noted that distortion (flattening) of the rubber roller is less at a higher durometer, consequently the contact area is less and the transfer pressure is greater. This is important at the higher line speeds where contact time is minimized. Thus a crate moving 18.3 meters per minute (60 feet per minute) past a roller of 38 mm diameter will. have a contact time of 1 millisecond per 1 degree of roller rotation where there is no roller distortion.

Roller pressure is provided by an air cylinder 64 activated by a conventional solenoid valve which in turn is operated by two (2) proximity switches, one to advance the roller and the other to retract. Other means, such as mechanical linkage are obvious and will not be listed here. The pressure is distributed across the length of the cylinder and for this particular ink, transfer ranges from 12 to 17 kilograms per centimeter of roller length are desirable.

Thus the invention results in the film being advanced at exactly the same rate as the crate is moving past the roller by virtue of the heat activated adhesive adhering to the high energy crate surface. The pressure roller 63, which rotates freely, maintains the same tangential speed as the linear speed of the film and crate. Thus the ink is transferred completely and without distortion.

For purposes of fast and complete adhesion the pressure roller 63 is molded to a hollow core. Suspended within the hollow core is a resistance heater operated through a controller. The heating element, rated at 500 W, will maintain the roller surface at any predetermined temperature. For purposes of the invention, the roller surface temperature range between 250° F. and 370° F. (120° C. and 190° C.).

Many silicone coated polymer films may be used for the printed substrate. High temperature films such as polyester may be operated in continuous contact with the heated roller. Low temperature films such as polypropylene must be prevented from contacting the heated roller during pauses in the labelling operation. To accomplish this, film guides 65 are used to support the film when the roller is retracted. The guides 65 are mounted to maintain a clearance of approximately 13 mm between the guides and the labelled surface. At the same time the roller is retracted approximately 13 mm behind the film. By maintaining these clearances, stretching and distortion of the film such as polypropylene is avoided. High temperature films would not require the guides.

It has also been discovered that film tension, especially on the film exit side of the roller, is important to complete ink transfer. Through trials, it was found a continuous tension of approximately 2.5 kilograms is useful. This is achieved through a spring loaded dancer arm and roller.

Conventional nip rollers and stepping motor are used to advance the film to the next label and position it accurately, using a printed mark to trigger an optical scanning device.

Protection of the ink against scratching by casual handling as well as insuring its weatherability when subjected to outdoor storage is achieved with the application of an acrylic based wax emulsion at station 66. This is applied by a roll applicator 68 which is supplied from a wet roller with a controlled amount of coating. Control is achieved with a doctor blade. The coating extends well past the edges of the ink pattern and seals the edges from intrusive moisture.

The final processing step is to coalesce the layers of the coating, label ink, and adhesive at station 67 by means of flame heater 67' and also to inter diffuse the adhesive layer with the polyethylene substrate formed by the crate 59. This discovery was made through extensive trials of many heating systems. As flame treatment was discovered to be the best technique that would provide the required surface energy for label adhesion, so it was discovered that flame treatment of the label and coating composite was the best technique that would develop the required water immersion durability without sacrificing mechanical properties or altering the visual characteristics of the applied label, or distorting the polypropylene crate 59.

Figure 2:
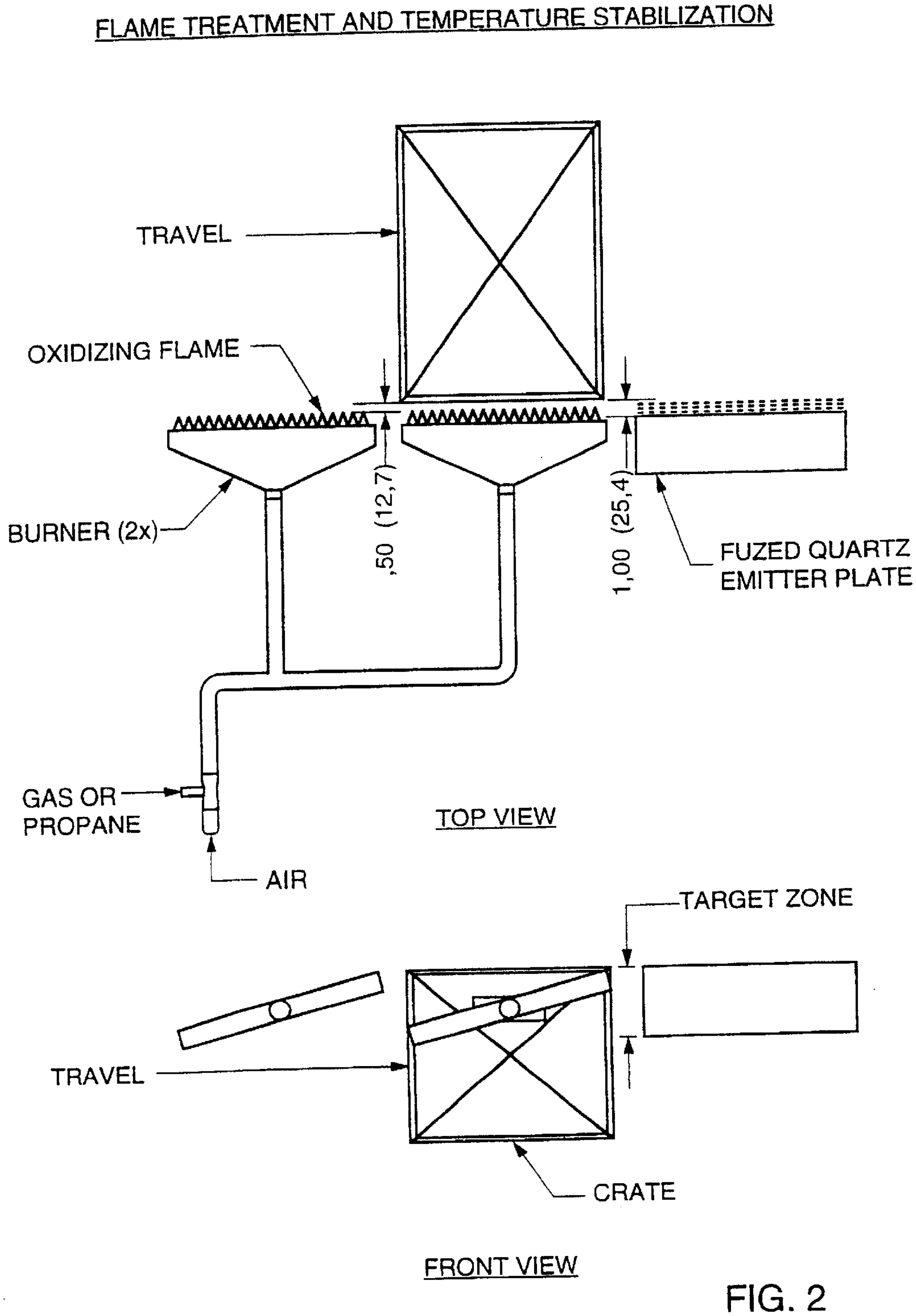
FIG. 2 Surface Treatment and Temperature Stabilization

FIG. 2 shows the technique of surface treatment and temperature stabilization.

Figure 3:
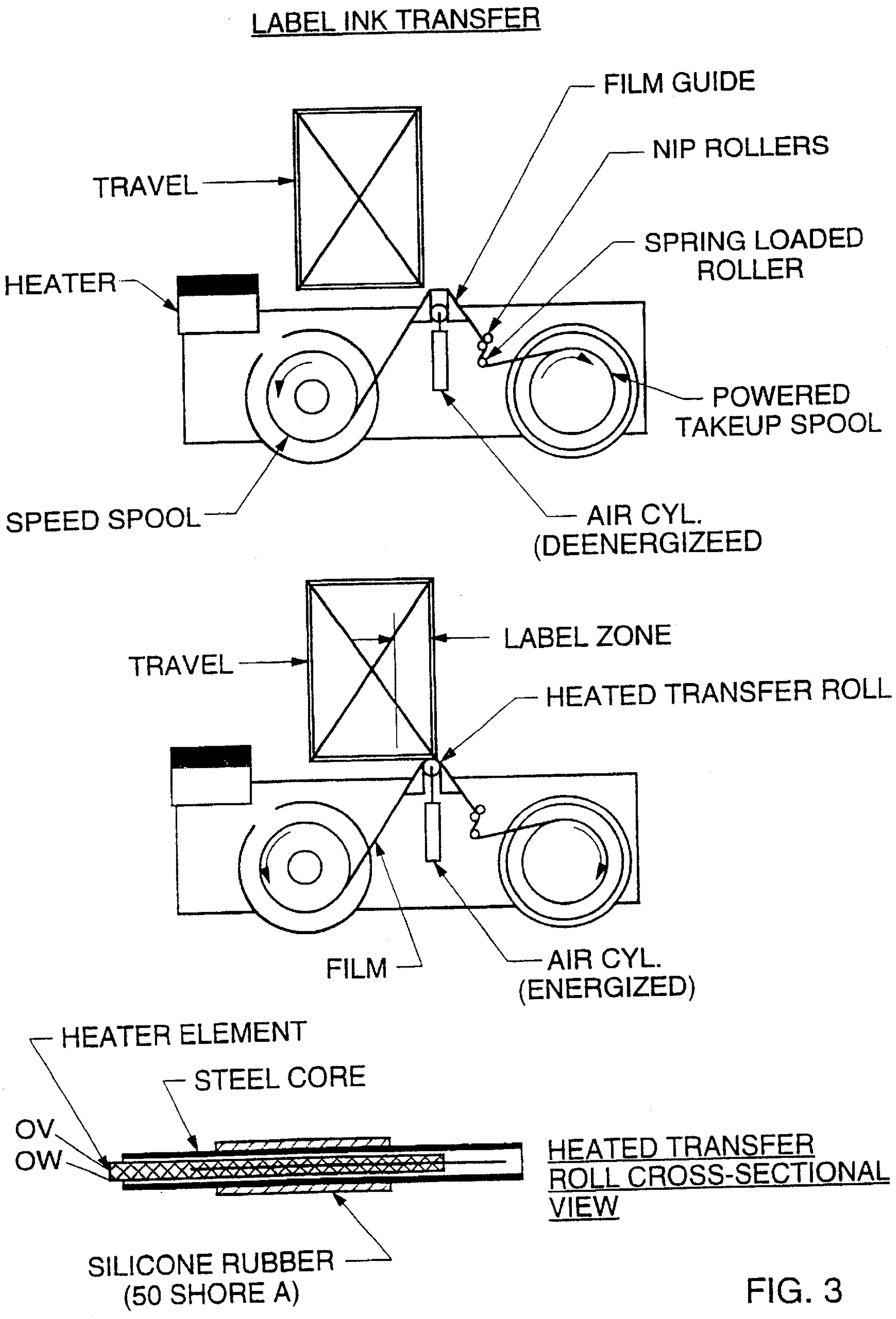
FIG. 3 Label Application and Ink Transfer

FIG. 3 illustrates the method of label application whereby the printed ink materials are transferred from the polypropylene film substrate to the polyethylene surface utilizing the tactile characteristics of the heat activated adhesive to overcome the bond of the ink layer 14 to the corona treated silicone coating 12.

Protection of the ink against scratching by casual handling as well as insuring its weatherability when subjected to outdoor storage is achieved with the system described in FIG. 4.

The final processing step is to coalesce the layers of the coating, label ink, and adhesive and also to inter diffuse the adhesive layer with the polyethylene substrate as shown in FIG. 5.

Figure 7:
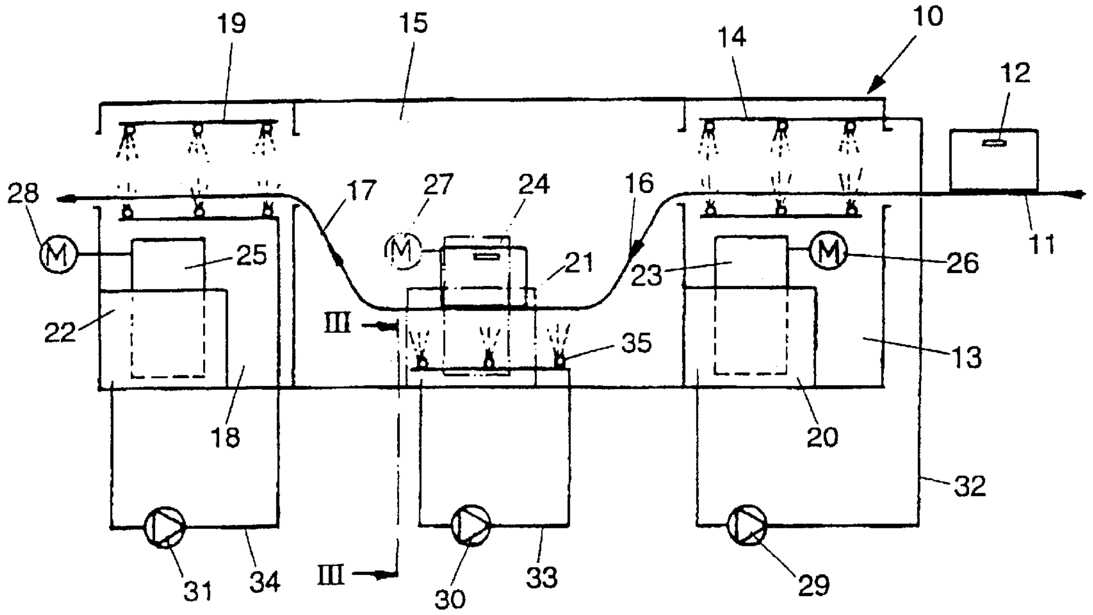
FIG. 7 shows a washing device for removal of a transfer layer according to the present invention from a container, in particular from a plastic crate.

FIG. 7 shows a schematic side view of a crate washing apparatus for removing the transfer layers according to the present invention from crates 112 that are supplied to the crate washer 110 via a transport conveyor 111. Crates 112 are first transported to pre-rinsing station 113 and sprayed with a pre-rinsing solution which is applied from a number of nozzles 114 located above and below the transport conveyor 111. The speed of the conveyor 111 is such that the dwell time of the crate 111 in the pre-rinsing station is between 6 and 8 seconds. The temperature of the pre-rinse solution is 60° C. The pre-rinse solution preferably comprises a 0.5% NaOH solution.

After passing through the pre-rinsing station 113, the crates are transported through a soaking station 115 via a downwardly sloping section 116 of the conveyor 111. The dwell time of crate in the soaking station is between 40 and 110 seconds. In the soaking station, the crate is completely submerged and a soaking solution is recirculated in the soaking station 115 by means of nozzles 35 to cause turbulent soaking conditions. The turbulent soaking may for instance include recirculating the liquid from the soaking station 115 via the nozzles 35 at a rate of 60 $m^3$/h for a total volume of the soaking solution of 5 $m^3$. It is important that the labels are completely removed from the crates 112 in the soaking station 115, without any pieces remaining on the crates. Such remaining pieces would, when dried, adhere firmly to the crates and form an undesirable contamination of the crate surface.

From the soaking station 115, the crates are transported via the upwardly sloping conveyor track 117 to an after-rinse station 118. The after-rinse solution may comprise water at a temperature of 30° C. The dwell time of the crates in the after-rinse station 118 is between 6 and 13 seconds.

Connected to each rinsing station 113, 118 and to the soaking station 115 are sieving sections 120, 121 and 122.

Each sieving section comprises a rotating belt sieve 123, 124, 125, which are driven by motors 126, 127, 128 respectively. Pumps 129, 130 and 131 draw the rinsing liquid and the soaking liquid from each perspective station through the rotating sieve belts 123 124, 125 a rate of for instance 60 $m^3$/h. The sieved liquids are recirculated back to nozzles 114 and 119 in the pre-rinse and after-rinse stations 113, 118 respectively and to the soaking station 115.

Figure 8:
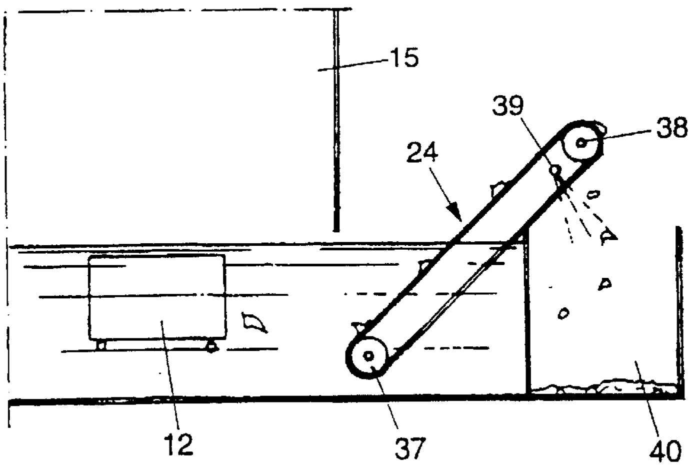
FIG. 8 shows a cross-sectional view of the washing device according to FIG. 7 along the line III—III.

FIG. 8 shows a cross-sectional view along the lines III—III of FIG. 7. It can be seen that the sieve belt 124 is rotated around two rollers 137, 138. The top end of the sieve belt 124 extends above the level of the soaking liquid in the soaking station 115. The sieve belt 124 comprises a dual layer belt-like sieving element with a mesh size of 2 millimeters. During operation it is important to continuously rotate the sieve belt 124 to prevent the label pieces from the transfer layers that break up into pieces in the soaking station 115, from clogging the sieve belt. A spraying nozzle 139 cleans the surface of the belt-like sieving elements by high pressure water or air jets. The removed label elements are collected in a collection compartment 140.

It was found that a very efficient removal of labels from crates 112 is achieved by using a 0.1 to 5%, preferably a 0.5% NaOH-solution in the pre-rinsing station 113 and the soaking station 115. However, it is also possible to apply a pre-treatment material onto the labels, prior to entry into the crate washer 110, which acts to soften the label prior to entry into the crate washer. For instance. a surface active component can be sprayed onto the crates 112 when travelling to the crate washer 110. It is also possible to apply a gel-like material of a chemical composition which starts attacking the label prior to entry into the crate washer 10. In such a case it may be possible to use water only in the crate washer 110, instead of the alkaline solution.

It is preferred that the properties of the label and the conditions in the crate washer are such, that the label breaks up into at least 4 pieces, which can be sieved from the water in the crate washer within a soaking time of not more than 20 minutes, preferably, within 10 seconds.

To illustrate the various properties which influence the adherence and the washability of the preferred transfer layer according to the present invention, the following tests were carried out, including a washing trial, a pencil scratch test, a water uptake/release test and a water vapour transmission rate test as described hereafter.

Washing Trial

To determine the optimum washing conditions for the labels according to the present invention, a label 50 was applied to a polyethylene crate. The dimensions of the label were about 10 by 10 centimeter and the adhesive layer 54 was a 100% urethane adhesive with a tack temperature of 79° C. The labels were applied to the crate with a temperature of roller 63 in FIG. 6 of 155° C. at a roller pressure of 2.5 bar. The pre-heat temperature of the crate (in stations 60 and 61 of FIG. 6), was 75° C. The speed of the crates 59 through the label applicator was 40 crates per minute. To determine the influence of the post-treat temperature with which the crates after label application were heated in station 67 of FIG. 6, post-treat temperatures of 40° C., 65° C. and 90° C. were used. After label application the crates were stored for at least 24 hours at a temperature of 20° C. The crates to which a label was applied, were thereafter soaked in a 0.5% NaOH-solution at temperatures of 20, 50 and 70° C.

The soaking of the crates was carried out in a soaking bath of 20 liters without turbulence, for such a soaking time (10–50 seconds) that after spraying the soaked crate with a showerhead at a rate of 6 liters/minutes, the label was completely removed within 2 seconds.

A second set of crates was prepared wherein after label application, a coating layer of wax was applied, such as at station 66 of FIG. 6.

The results of the soaking times required for label removal within 2 seconds, versus the water permeability coefficient and the post-treatment temperature. are given in tables I and II. From table I it can be seen that for labels to which no wax layer was applied the soaking time decreases drastically at temperatures of the soaking solution above 20° C. For post-heat temperatures of 90°, the durability of the label increased and the soaking times remain above 5 seconds.

TABLE I crate washing trial (no wax layer applied)

| T (° C.) | postheat (° C.) | WPC | 0.5% caustic Time (sec) | Time (sec) | Time (sec) | Average (sec) |
|---|---|---|---|---|---|---|
| 20 | none | — | 90 | 120 | | 105 |
| | 40 | — | 180 | 150 | | 165 |
| | 65 | — | 210 | 240 | | 225 |
| | 90 | — | 480 | 420 | | 450 |
| 50 | none | — | 2 | 2 | 2 | 2 |
| | 40 | — | 3 | 3 | 3 | 3 |
| | 65 | — | 3 | 3 | 4 | 3.4 |
| | 90 | — | 15 | 14 | 13 | 14 |
| 70 | none | — | 1 | 1 | 1 | 1 |
| | 40 | — | 1 | 1 | 1 | 1 |
| | 65 | — | 1 | 1 | 1 | 1 |
| | 90 | — | 6 | 6 | 7 | 6.3 |

It was found that an optimum post-heat temperature was between 65° C. and 90° C. At a post-heat temperatures below 65° C., too little coalescing of the applied transfer layer was achieved, such that the applied transfer layers had insufficient durability and could be too easily removed during storage and use. At post-heat temperatures higher than 90° C., the durability of the transfer layer became too large, and quick removal times could not be achieved in an economically feasible manner. During the spraying period with the showerhead, it was observed that after soaking, the labels detached from the crate and broke up in several (2 to 4) pieces.

When prior to the flame treatment step at station 67 in FIG. 6 a wax layer is applied at station 66, the water permeability coefficient is decreased and the durability of the labels is improved, and soaking times are increased. From table II it can be seen that for a 0.5% caustic solution, the wax coating leads to longer soaking times.

TABLE II crate washing trial (with wax layer applied)

| T (° C.) | postheat (° C.) | WPC | 0.5% caustic Time (sec) | Time (sec) | Time (sec) | Average (sec) |
|---|---|---|---|---|---|---|
| 20 | none | — | 150 | 150 | | 150 |
| | 40 | — | 180 | 180 | | 180 |
| | 65 | 0.7 | 300 | 270 | | 285 |

TABLE II-continued

| crate washing trial (with wax layer applied) | | | | | | |
|---|---|---|---|---|---|---|
| | | | 0.5% caustic | | | |
| T (° C.) | postheat (° C.) | WPC | Time (sec) | Time (sec) | Time (sec) | Average (sec) |
| | 90 | — | <600 | | | 600 |
| 50 | none | — | 4 | 4 | 5 | 4.3 |
| | 40 | — | 6 | 6 | 6 | 6 |
| | 65 | 0.7 | 7 | 7 | 8 | 37.3 |
| | 90 | — | 13 | 14 | 16 | 14.3 |
| 70 | none | — | 2 | 2 | 3 | 2.3 |
| | 40 | — | 2 | 2 | 2 | 2 |
| 65 | 0.7 | 2 | 2 | 2 | 2 | |
| | 90 | — | 6 | 6 | 7 | 6.3 |

It was observed that by trying to remove the labels as were tested in the washing trial described above, solely with high pressure water jets at 20° C. and at a pressure of 120 bar, at a conveyor speed of 15 meters per minutes and a spraying angle of 90° at a distance of 10 centimeters, no label removal was achieved. Even for labels without any wax coating and no post-heat treatment, no removal by means of high-pressure water jets was possible.

Pencil Scratch Test

The purpose of the pencil scratch test is to identify the minimum and maximum durability of a label which can be obtained by taking different measures such as the use of a covering wax layer and heat treatment to cause coalescing of the label layers. Crates with labels which were applied with different post-heating temperatures, with and without wax, have been tested.

The labels were the same labels as used in the washing trial described above, and were applied to the crates under the same conditions.

The pencil scratch tests were carried out with a "scare resistance test model 435" supplied by Erichsen (PO Box 720, D-5870 Hemer Germany).

During the scratch test, a pencil with a plastic insert was used to scratch the label at an angle of 90° horizontally in the middle thereof.

After label application, the crates were stored for at least 24 hours at a temperature of 20° C. Prior to scratching, the crates were soaked in a water without turbulence at 20° C. The results of the scratch test are given in tables III and table IV in which the scratch results are given in N.

TABLE III

| Pencil scratch test (in N) label without wax coating | | | | | | | | | |
|---|---|---|---|---|---|---|---|---|---|
| Post-heat Temperature | | soaking time (min) | | | | | | | |
| (° C.) | WPC | 0 | 0.5 | 1 | 1.5 | 2 | 2.5 | 3 | 3.5 |
| none | — | 1 | 0.4 | 0.2 | 0.1 | | | | |
| | | 1 | 0.3 | 0.2 | 0.1 | | | | |
| 40 | — | 1.3 | 0.9 | 0.2 | 0.1 | | | | |
| | | 1.1 | 0.7 | 0.2 | 0.1 | | | | |
| 65 | — | 1.1 | 0.7 | 0.2 | 0.1 | | | | |
| | | 1 | 0.5 | 0.1 | 0.1 | | | | |
| 90 | — | 1.5 | 1.2 | 0.8 | 0.6 | 0.6 | 0.4 | 0.2 | 0.1 |

TABLE III-continued

| Pencil scratch test (in N) label without wax coating | | | | | | | | | |
|---|---|---|---|---|---|---|---|---|---|
| Post-heat Temperature | | soaking time (min) | | | | | | | |
| (° C.) | WPC | 0 | 0.5 | 1 | 1.5 | 2 | 2.5 | 3 | 3.5 |
| | | 1.1 | 1 | 0.8 | 0.6 | 0.5 | 0.3 | 0.2 | 0.1 |

TABLE IV

| Pencil scratch test (in N) label with wax coating | | | | | | | | | | | | | | |
|---|---|---|---|---|---|---|---|---|---|---|---|---|---|---|
| Post-treat | soaking time (min) | | | | | | | | | | | | | |
| (° C.) | 0 | 0.5 | 1 | 1.5 | 2 | 2.5 | 3 | 4 | 5 | 6 | 7 | 8 | 9 | 10 |
| none | 5 | 3 | 1.4 | 0.5 | 0.3 | 0.2 | 0.1 | | | | | | | |
| | 5 | 3 | 1.5 | 0.7 | 0.4 | 0.2 | 0.1 | | | | | | | |
| 40 | 5 | 2.8 | 1.3 | 0.4 | 0.3 | 0.1 | | | | | | | | |
| | 5 | 3 | 1.4 | 0.6 | 0.4 | 0.2 | 0.1 | | | | | | | |
| 65 | 5 | 2.5 | 1.2 | 0.5 | 0.3 | 0.2 | 0.1 | | | | | | | |
| | 5 | 2.9 | 1.3 | 0.5 | 0.2 | 0.1 | | | | | | | | |
| 90 | 5 | 4 | 2.5 | 1.3 | 0.7 | 0.7 | 0.6 | 0.4 | 0.4 | 0.4 | 0.3 | 0.3 | 0.3 | 0.3 |
| | 5 | 1 | 2.8 | 1.5 | 0.8 | 0.7 | 0.5 | 0.3 | 0.3 | 0.3 | 0.2 | 0.2 | 0.2 | 0.2 |

From table III and IV it can be seen that the post-heat flame treatment does not seem to influence the scratch resistance of the label significantly. From table IV it appears that application of a wax layer covering the label, decreases the water permeability coefficient and improves the scratch resistance of the dry label significantly. It was found that for high post-heat flame treatment temperatures of 110° C. in combination with a wax coating, a scratch force of 8 Newton was achieved. Labels with a pencil hardness of 8 Newton are considered to be semi-permanent labels which cannot be removed in an economically feasible manner.

Also at post-heat temperatures above 90° C., problems occurred during labelling as at these temperatures the polyethylene crates became brittle after a few applications, the crate pigments were found to discolor and deformations of the softened crates on the conveyor and the pelletizer were found to occur.

At a post-heat temperature below 65° C., the strength of the labels was found to be insufficient for labels which did not have a wax coating. For labels without a wax coating the target pencil hardness in the dry state should be around 1.2 N and the soaking time until the scratch force drops below 0.3 Newton should be below 3 minutes. For a wax coated label, the target scratch force should be about 5 Newton in the dry state and the soaking time until the scratch force drops below 0.3 N should be below 10 minutes. Transfer layers having the above properties were found to have an optimal combination of durability and washability.

Water Uptake Test

The labels according to the present invention can be easily removed from a container, in particular from a plastic crate due to their specific water permeability which allows the soaking solution to penetrate the label, and subsequently break up the label in pieces and detach it from the container. It was found that preferred labels have a water permeability coefficient of about 0.5, corresponding to a water absorption of around 5 g/m$^2$ after 3 hours, in a water uptake test as described below. Labels according to the invention have a water uptake value higher than 0, preferably higher than 1 and less than 100, preferably less than 75 g/m$^2$ after 24 hours. The water release of a preferred label was 4.5 g/m$^2$ within 30 minutes in the water release test as described below. Preferred labels according to the present invention will have a water release value greater than 0 and less than 100 g/m$^2$ in hours.

Two samples were prepared, each sample containing 2 labels of a thickness of 12.7 μm each at 22.4° C. and 48% relative humidity, each sample having a surface area of 85.8 cm$^2$. For each sample, two labels were applied on a single piece of clear glass of 3 inch×9 inch×0.02 inch. Due to the extremely low weight of the labels it was necessary to apply two labels per piece of glass to obtain a weight that would register within the range of a two decimal place electronic gram scale.

The samples were prepared as follows: the glass supports were thoroughly cleaned and placed in a heating oven until an approximate temperature of 130° C. was reached on the glass surface. The glass was then removed from the heating oven and placed on a silicone rubber mat. A label was immediately set on the glass and secured to the surface by the use of a silicone roller. Rolling pressure was continually supplied to the full length of the label until all entrapped air was removed (approximately 5–6 back and forth motions). After the glass had cooled, the carrier film was removed. Thereafter the opposite side of the glass plates were labelled by heating a clean aluminum plate (slightly larger than the glass plate) to approximately 131° C. in a convective oven, then placing the glass on the surface of the aluminum plate (label surface down) which allowed the heating of the glass upper surface. The label was then applied and secured in place by the silicone roller as described above. Once again, when the glass cooled, the carrier film was removed. Next a wax coating having a dry weight of 0.043 grams was applied to the surface of both labels. In the final step, using a propane oxidizing flame, flame treatment was applied to both labels by quickly passing the flame across the entire surface of the label sample. Once the samples were cooled the labels were ready for the Water Uptake test.

A stainless steel immersion tank of a 33.66 centimeter diameter and 24.13 centimeter height was filled with the deionized water. Care was taken that the water level was deep enough to allow total immersion of the sample. The sample was placed with the short dimension set perpendicular to the bottom of the tank. The glass supports were placed on a thin wire frame in the immersion tank. A thermocouple was installed inside the water immersion tank. After each time period, as given in table V, the sample was removed from the tank, excess surface water was blotted dry, the sample was weighted and placed back in the tank. This procedure was continued for the duration of the test. The results are shown in table V. With regard to sample 1, this sample reached it maximum absorption of 0.04 grams at the 3 hour mark and maintained this level to the 5 hour mark. After the 5 hour period the label lost its ability to hold water. We believe this phenomenon was caused because of label structure degradation. For sample 2, this sample also reached its maximum absorption of 0.04 grams at a 3 hour mark. At the 5 hour mark this sample was terminated from further testing in preparation for the water release test described below.

From the water uptake test, at can be deduced that a preferred label of a thickness of 12.7 microns has a water uptake value of 0.04 g/85.8 cm$^2$ or about 5 g/m$^2$ after 3 hours at room temperature.

TABLE V

Water Uptake Test

| Time | Sample 1 Weight in grams | Sample 2 Weight in grams | Tank Water Temperature (° F.) |
|---|---|---|---|
| 8:00 a.m. | 59.77 g | 59.77 g | 71 |
| 8:10 a.m. | 59.80 g | 59.80 g | 71 |
| 9:00 a.m. | 59.81 g | 59.81 g | 71 |
| 10:00 a.m. | 59.83 g | 59.83 | 71 |
| 11:00 a.m. | 59.85 g | 59.85 g | 72 |
| 12:00 p.m. | 59.85 g | 59.85 g | 72 |
| 1:00 p.m. | 59.85 | | 72 |
| 2:00 p.m. | 59.84 g | | 72 |
| 3:00 p.m. | 59.81 | | 72 |

Water Release Test

Immediately after the conclusion of the above Water Uptake Test the sample 2 as prepared above was subjected to the water release test. The sample was blotted to remove access water, weighted and the data were recorded. The sample was first exposed to ambient temperature for one half hour and weighed. Half an hour after weighing the sample, it was placed in a prewarmed (53° C.) test oven (small electrically heated oven, Quieny Lab Inc., Model 20 Lab oven or equivalent). The sample was left in the prewarmed oven for more than one hour and weighted. Thereafter the sample was placed back in the test oven and remained there for 3.5 hours.

From table VI it can be concluded that the water absorbed by sample 2 was released within 30 minutes exposure to ambient room temperature and humidity (48%). In fact, the sample registered a weight loss of 0.01 grains from its original weight which could seem to indicate that the label was not thoroughly dried at installation. So a preferred label of 85.8 cm$^2$ size and 12.7 μm thickness has water release greater than 0 and less than 0.10 g/24 hours with a mean release of 0.045 g within 30 minutes given these parameters.

TABLE VI

Water Release Test

| Time | Sample 2 Weight in Grams | Room Temperature (° F.) | Relative Humidity | Oven Temperature (° C.) |
|---|---|---|---|---|
| 12:00 p.m. | 59.85 g | 72.6 | 48 | 53.5 |
| 12:30 p.m. | 59.76 g | 72.6 | 45 | 53.7 |
| 1:30 p.m. | 59.76 g | | | 52.3 |
| Next Reading 5:00 a.m. | 59.76 g | | | 53.0 |

Water Vapor Transmission Rate Test

The optimum combination of durability and washability of the labels according to the invention is at least partly due to the permeability of the label for the soaking solution. A sample of the transfer layer of the sane type as tested in the water uptake/release test of a thickness of 12.7 μm (microns) was tested for water vapour transmission. A 25 milliliter glass container with a 15.9 milliliter orifice was cleaned with acetone and filled with approximately 10 milliliters of deionized water. The orifice area of the container was heated to approximately 47.8 (118° F.) and a circle segment of the transfer layer was firmly applied using a small piece of silicone rubber as a pressure pad. After the container/label had cooled, the backing film was gently removed. The sample preparation was completed by adding a wax coating (0.001 g across the 1.99 $cm^2$ surface) and let air dry. A second glass container of the same dimensions as described above was cleaned thoroughly with acetone and filled with 10 ml of deionized water. The orifice area of the sample was heated as well. This sample was used as the control sample. The completed samples were then weighted various intervals over a 26.6 hour time period. The water vapour transmission rate over the total time of the experiment equated to 568.75 $g/m^2$ in a 24 hour time period at 22.2° C. at 46% relative humidity. It was found that a "steady state" water vapour transmission rate was not achieved until approximately 28 minutes from time 0. when using the "steady state" data after 28 minutes from time 0, the water vapour transmission rate was found to be about 525 $g/m^2$ in 24 hours.

For the control sample without a label, a water vapour transmission rate over the total time of the experiment of 1085.7 $g/m^2$ in 24 hours was found. The water vapour transmission rate of the preferred label according to the present invention will lay between 50 and 750 $g/m^2$ after 24 hours (22.2° C., 44% relative humidity), preferably around 500 $g/m^2$ after 24 hours.

It will Le appreciated that further modifications could be made to the embodiment disclosed above, while still obtaining many of the advantages and without departing from the scope of the invention as defined in the appended claims.

What is claimed is:

1. Transfer label comprising a backing layer and a transfer layer which is releasably attached to the backing layer, said transfer layer comprising an ink-only label, said ink-only label comprising an adhesive layer, an ink-only image layer and optionally a protective layer, said ink-only image layer being disposed between said adhesive layer and said backing layer before the transfer layer is applied to a substrate, and wherein the said ink-only label, when separated from said backing layer and applied to a substrate, has a water permeability coefficient, as defined herein, which is sufficient to enable fast removal of the label from the substrate with water or an aqueous alkaline solution, without destructive treatment of the said substrate, said ink-only label in its dry state having a pencil hardness between 1N and 7N, said ink-only label having a pencil hardness less than 0.5N after a soaking time between 1 and 15 minutes in water of 20° C.

2. Transfer label according to claim 1, wherein a transparent, protective coating has been applied over said image layer.

3. Transfer label according to claim 1, wherein said ink-only label comprises a coalesced adhesive layer and image layer, optionally together with a protective layer.

4. Transfer label according to claim 1, wherein the ink of the image layer is a polymeric ink.

5. Transfer label according to claim 1, wherein the ink is water-soluble.

6. Transfer label according to claim 1, wherein the adhesive is a heat activatable adhesive with an initial tack temperature of 90° C. maximum.

7. Transfer label according to claim 6, wherein the adhesive is a urethane-acrylic adhesive.

8. Transfer label according to claim 1, wherein the protective coating is based on an acrylic wax.

9. Transfer label according to claim 8, wherein the transfer label, when applied to a substrate breaks up in at least 4 pieces under turbulent soaking conditions in an aqueous liquid of a temperature below 100° C. within a soaking time of not more than 20 minutes and becomes detached from the substrate.

10. Transfer label according to claim 8, wherein the transfer label, when applied to a substrate breaks up in at least 4 pieces under turbulent soaking conditions in an aqueous liquid of a temperature below 70° C. within a soaking time of not more than 20 minutes and becomes detached from the substrate.

11. Transfer label according to claim 8, wherein the transfer label, when applied to a substrate breaks up in at least 4 pieces under turbulent soaking conditions in an aqueous liquid of a temperature below 100° C. within a soaking time of not more than 10 seconds and becomes detached from the substrate.

12. Transfer label according to claim 8, wherein the transfer label, when applied to a substrate breaks up in at least 4 pieces under turbulent soaking conditions in an aqueous liquid of a temperature below 70° C. within a soaking time of not more than 10 seconds and becomes detached from the substrate.

13. A transfer label according to claim 1, wherein said ink-only label, when applied to a plastic substrate, has a water permeability coefficient between 0.15 and 2.5.

14. A transfer label according to claim 1, wherein said ink-only label has a water vapor transmission value between 50 and 750 $g/m^2/24$ h.

15. A transfer label according to claim 1, wherein the ink of the image layer is a urethane-based ink.

16. A transfer label according to claim 1, wherein the ink of the image layer is a vinyl-based ink.

17. A transfer label according to claim 1, wherein the ink of the image layer is an acrylic-based ink.

18. A transfer label according to claim 1, said ink-only label on a plastic container having a water uptake value after 3 hours greater than 1 and below 75 $g/m^2$.

* * * * *

UNITED STATES PATENT AND TRADEMARK OFFICE

CERTIFICATE OF CORRECTION

PATENT NO. : 6,379,766 B1 
DATED : April 30, 2002
INVENTOR(S) : Patrick Johannes Blom et al.

It is certified that error appears in the above-identified patent and that said Letters Patent is hereby corrected as shown below:

Column 4,
Line 44, please delete "improved" and insert therefor -- improved, --.

Column 5,
Line 47, please delete "layers." and insert therefor -- layers, --.

Column 7,
Line 57, please delete "all." and insert therefor -- all --.
Line 60, please delete "many" and insert therefor -- may --.
Line 61, please delete "another (30)" and insert therefor -- another. (30) --.

Column 8,
Line 5, please delete "organic .material" and insert therefor -- organic material --.
Line 17, after "detail", please begin a new paragraph starting with -- FIG. 6 --.
Line 33, please delete "$g/m^2$." and insert therefor -- $Ergs/cm^2$ (Dynes per centimeter). --.
Line 36, please delete "$g/m^2$" and insert therefor -- $Ergs/cm^2$ (Dynes per centimeter) --.
Line 50, please delete "infrared" and insert therefor -- infra-red --.

Column 9,
Line 15, please delete "will. have" and insert therefor -- will have --.

Column 11,
Line 39, please delete "preferably, within" and insert therefor -- preferably within --.

Column 12,
Line 9, please delete "temperature. are" and insert therefor -- temperature are --.

Column 13,
Table II-continued, second to last row in table, please shift the row one column to the right so that it begins with "65" is in "postheat (° C.)" column and ends with "2" in the "Average (sec)" column.

Column 15,
Line 64, please delete "at" and insert therefor -- it --.

UNITED STATES PATENT AND TRADEMARK OFFICE

CERTIFICATE OF CORRECTION

PATENT NO. : 6,379,766 B1
DATED : April 30, 2002
INVENTOR(S) : Patrick Johannes Blom et al.

It is certified that error appears in the above-identified patent and that said Letters Patent is hereby corrected as shown below:

Column 16,
Table VI, please delete "45" from the "Relative Humidity" column and insert therefor -- 48 --.

Column 17,
Line 24, please delete "when" and insert therefor -- When --.
Line 35, please delete "Le" and insert therefor -- be --.

Signed and Sealed this

Nineteenth Day of November, 2002

*Attest:*

JAMES E. ROGAN

*Attesting Officer* *Director of the United States Patent and Trademark Office*